United States Patent [19]
Vogelsang et al.

[11] 3,799,140
[45] Mar. 26, 1974

[54] CYLINDER ARRANGEMENT FOR COMBUSTION ENGINES HAVING A PRE-COMBUSTION OR ANTE-CHAMBER AND A COMBUSTION CHAMBER

[75] Inventors: Gustav Vogelsang, Braunschweig; Istvan Geiger, Wolfsburg, both of Germany

[73] Assignee: Volkswagonwerk Aktiengesellschaft, Wolfsburg, Germany

[22] Filed: July 12, 1971

[21] Appl. No.: 161,843

[30] Foreign Application Priority Data
July 29, 1970   Germany............................ 2037532

[52] U.S. Cl. ......................... 123/191 S, 123/32 SP
[51] Int. Cl. .............................................. F02b 19/16
[58] Field of Search .. 123/32 C, 32 D, 32 K, 32 ST, 123/191 S, 193 P, 193 CP, 32 SP

[56]  References Cited
UNITED STATES PATENTS

| R18,575 | 8/1932 | Oberhaensli..................... | 123/191 S |
| 3,063,434 | 11/1962 | Haas.............................. | 123/32 SP |
| 2,893,360 | 7/1959 | Muller............................ | 123/32 SP |
| 1,384,401 | 7/1921 | Noble............................. | 123/191 S |
| 3,508,530 | 4/1970 | Clawson......................... | 123/191 S |

FOREIGN PATENTS OR APPLICATIONS

| 816,140 | 12/1937 | France............................. | 123/32 SP |
| 584,304 | 9/1959 | Canada............................ | 123/191 S |
| 300,384 | 10/1954 | Switzerland..................... | 123/32 SP |

*Primary Examiner*—Laurence M. Goodridge
*Assistant Examiner*—Cort Flint
*Attorney, Agent, or Firm*—Ernest F. Marmorek

[57]  ABSTRACT

A cylinder arrangement for combustion engines in motor vehicles with external ignition comprising a cylinder having a piston mounted therein for movement, a combustion chamber and a pre-combustion or ante-chamber in communication with each other, a valve means opening into the pre-combustion chamber for injecting the fuel mixture thereinto and a spark-plug having electrodes for the ignition of such mixture, the combustion chamber having an extension adjacent the pre-combustion chamber, with such extension having a saw-tooth-like cross section wth a steep side and a flat side, the pre-combustion chamber communicating with the combustion chamber adjacent the steep side of the saw-tooth-like extension chamber, the flat side of the extension chamber going over to the pre-combustion chamber in a tangential fashion.

12 Claims, 2 Drawing Figures

CYLINDER ARRANGEMENT FOR COMBUSTION ENGINES HAVING A PRE-COMBUSTION OR ANTE-CHAMBER AND A COMBUSTION CHAMBER

FIELD OF THE INVENTION

The present invention relates to a cylinder arrangement for combustion engines with external ignition having a cylinder in which a piston is arranged for movement, the cylinder including a combustion chamber and a precombustion or ante-chamber connected to the combustion chamber, the pre-combustion chamber having a fuel inlet thereto and a spark-plug protruding thereinto with its electrodes.

BACKGROUND OF THE INVENTION

Cylinder arrangements of the above-described type are especially known in connection with combustion engines for motor vehicles and have been widely publicized, since due to their subdivision into a combustion chamber itself and into a pre-combustion chamber or ante-chamber which receives the electrode of a spark-plug, they are capable of producing a combustion process having an efficient fuel composition and a favorable exhaust gas content even on poor mixtures, and since by providing a pre-combustion chamber or ante-chamber within the region of the spark plug one is able to concentrate locally a highly combustible rich mixture near the spark plug.

Cylinder arrangements having a combustion chamber and an ante-chamber or pre-combustion chamber connected thereto may give rise to difficulties when one considers that different excess air numbers of the mixtures in the combustion chamber and in the pre-combustion chamber should be observed and, to this effect, the pre-combustion chamber should possibly be well separated from the combustion chamber; and on the other hand, problems are created in that, in the case of such well separable pre-combustion chamber, it is hard to obtain a good preparation of the mixture and an effective diffusion or flushing thereof. The preparation of the mixture is especially important since usually the fuel addition to the pre-combustion chamber is performed by means of an injection nozzle in order that in the right moment, that is at the desired moment of the ignition, one could have a combustible mixture in the region of the electrode of the spark-plug.

SUMMARY OF THE INVENTION

It is, therefore, an object of the present invention to provide a cylinder arrangement of the above-described type which eliminates the difficulties described in connection with the hitherto known cylinder arrangements in combustion engines.

In accordance with the present invention the combustion chamber near or adjacent the pre-combustion or ante-chamber has an extension having a saw-tooth-like cross section which, in the region of its steep side, goes over into the pre-combustion chamber in such a manner that the flat side of the saw-tooth becomes at least approximately tangential to the wall of the pre-combustion chamber.

The extension having the saw-tooth cross section according to the present invention one may consider having the function of a pressure chamber. This aids during the compression cycle of the cylinder arrangement in that along the flat side of the saw-tooth-like cross section of the chamber a pressure is translated onto the volume of the pre-combustion chamber which causes a turbulence of the contents of the pre-combustion chamber. In order to attain this turbulence effect it is necessary that the flat side of the saw-tooth should go over into the wall portion of the pre-combustion chamber without any flow resistance. Constructively this is expressed by the statment "approximately tangential."

At this point it should be mentioned that the cylinder arrangement to which the present invention is applicable should include not only a cylinder arrangement having a displacement or stroke-type piston moving therein, but it should also be extended to engines having a rotating type piston therein. Also in the case of cylinder arrangements having rotating-type pistons therein, the cylinder itself represents a fixed housing portion in which the piston moves or rotates. Therefore, also in the last mentioned type piston arrangements a pre-combustion chamber can be provided for receiving a spark plug with its electrodes and this can have a connection with an extension of the combustion space itself as a pressure chamber. In case of engines having a rotating-type piston, the pressure chamber should be arranged in such a manner that in the rotational direction of the piston the pressure chamber becomes deeper.

In the preferred embodiment of the present invention which refers to a displacement-type piston, according to the present invention, the piston carries a projection on its upper surface facing the extension and which shape-wise follows the shape of the extension itself and which in the upper dead point of the displacement of the piston protrudes into the extension. By means of this specially shaped projection a controlled build-up of the pressure is attained which leads to a desired turbulence of the volume of the pre-combustion chamber.

It has been specially advantageous that the projection at the upper dead point of the piston displacement fills the extenstion by leaving a certain gap therewith. This gap can be wider than a gap which is formed between the combustion chamber wall and the regions of the upper surface of the piston adjacent to the projection.

BRIEF DESCRIPTION OF THE DRAWING

The invention will become more readily apparent from the following description of a preferred embodiment thereof shown, by way of example, in the accompanying drawing, in which.

DESCRIPTION OF THE PREFERRED EMBODIMENT

Figure 1:
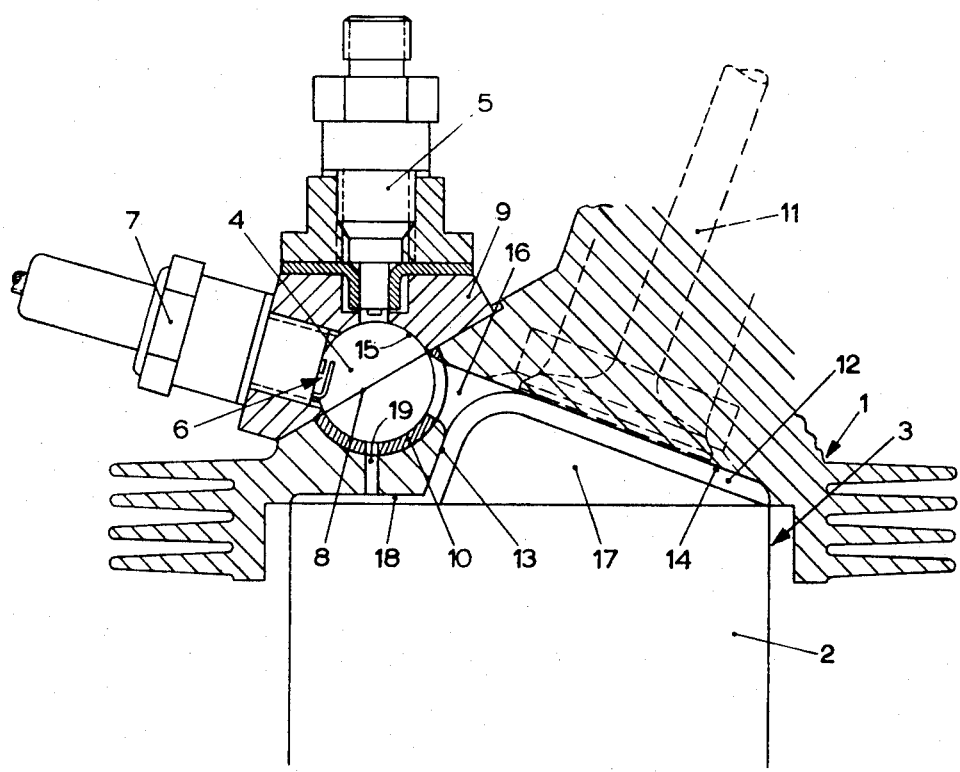
FIG. 1 is a sectional elevation view of a cylinder arrangement according to this invention in a reciprocating piston engine.

With reference to the single figure it is seen that the cylinder arrangement substantially comprises a cylinder 1 having a displacement-type piston 2 movably arranged therein. The cylinder 1 comprises the combustion chamber 3 and the pre-combustion or ante-chamber 4 into which, in the illustrated embodiment, a fuel injection valve 5 opens and into which also the electrodes 6 of a spark plug 7 protrude. The pre-combustion chamber 4, as seen in the drawing, and as represented by the separating line 8, is subdivided, and said dividing line 8 defines a cover member 9 into which the injection valve 5 and the spark plug 6 are placed and which, for example, by being screwed into the cylinder 1, can be connected to the cylinder block.

As also seen in the drawing, the injection valve 5 is so arranged that the fuel is injected onto an insert 10 made from a heat resistant or heat accumulating material which aids the evaporation of the fuel.

The injection valve 5 serves for the making of a combustible, that is, a relatively rich mixture in the pre-combustion chamber 4. The combustion chamber 3 itself is, on the other hand, supplied only with a poor mixture by a carburetor through an inlet valve 11 having a conventional construction.

According to the present invention the combustion chamber 3 is provided with a pressure chamber 12 which, in the illustrated embodiment, is easily recognizable as being an extension of the combustion chamber 3 itself and having a saw-tooth-like cross section. In the region of the steep side of this saw-tooth-like cross section the pre-combustion chamber communicates with the pressure chamber 12 in such a manner that the flat side 14 of the saw-tooth-like cross section goes over at least approximtely tangentially into the upper wall portion 15 of the pre-combustion chamber 4, as seen in the figure. Accordingly, the pre-combustion chamber 4 with the short connecting passage 16 forms a retort-like arrangement, as seen in the cross sectional illustration, and as a result of which during the upward movement of the piston 2 during the compression cycle, turbulences appear in the precombustion chamber 4 which lead to a good mixing of the fuel injected by the valve 5 with the mixture of the high excess air member which from the combustion chamber 3 through the pressure chamber 12 reaches the pre-combustion chamber 4.

The piston 2 in order to aid this pressure relation is provided on its upper frontal surface with a projection 17 which is shaped in a complementary fashion to the shape of the pressure chamber 12 so that, when the piston 2 is in its upper dead point position, there remains a small passage 12 between the cross section of the projection defined by the sides 13 and 14 and between the pressure chamber wall 12. This passage or gap 12 is somewhat wider than the passage or gap 18 formed between the combustion chamber wall and that region of the piston 2 which is adjacent to the projection 17. In order to aid the good flushing of the pre-combustion chamber 4 during the suction and the compression cycles, a scavenging passage 19 can also be provided.

From the above, it is apparent that although the invention has been described hereinbefore with respect to a certain specific embodiment thereof, it is evident that many modifications and changes may be made without departing from the spirit of the invention. Accordingly, by the appended claims we intend to cover all such modifications and changes as fall within the true spirit and scope of this invention.

Figure 2:
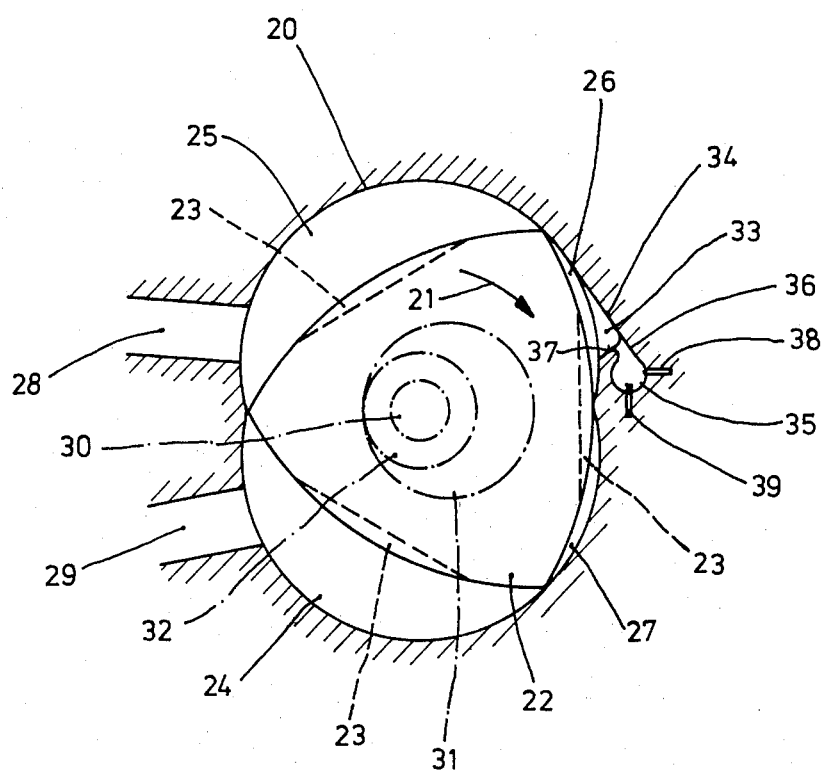
FIG. 2 is a sectional view of the inventive cylinder arrangement in a rotary piston engine.

FIG. 2 illustrates a cross-section of a conventional rotary piston engine including an epitrochoid housing 20, a rotary piston 22 rotating within the housing in the direction of the arrow 21. The piston, as known, has three edges sweeping along the inner wall of the housing to form therewith enclosed chambers 24 to 27. A fuel inlet port 28, a gas exhaust port 29, driven shaft 30, internal gearing 31 and a gear wheel 32 mounted on the housing 20, are also arranged in a conventional manner.

According to this invention, however, a part of the housing wall defining with a facing wall portion of the piston 22 a combustion chamber 26, is provided with a saw-tooth-shaped extension chamber 33 the flat sloping surface of which communicates substantially tangentially with a precombustion chamber 35 in which a fuel injecting valve 38 and a spark plug 39 are disposed. The open base of the extension chamber 33 extends across a major portion of the working wall of the combustion chamber 26; the precombustion chamber 35 is situated in the region of the remaining portion of the working wall of the housing 20 in the chamber 26 so that the passage 36 between the combustion chamber 26 and the precombustion chamber opens into the steep wall 37 of the extension chamber 33 and can be made very short thereby reducing the temperature losses of the ignition wave to minimum.

Having thus described the invention, what we claim as new and desire to be secured by Letters Patent, is as follows:

1. A cylinder arrangement for combustion engines with external ignition,
comprising in combination
cylinder means including a combustion chamber,
a piston mounted for movement in said combustion chamber to define a maximum space and, respectively, a minimum space between its face and a working wall of said combustion chamber,
an extension chamber of a saw-tooth-like configuration having a base side communicating with a portion of said working wall,
a flat side sloping upwardly from a peripheral region towards the central region of said working wall, and a steep side adjacent the remaining portion of said working wall,
a precombustion chamber including fuel injecting means and spark producing means and located in the region of said remaining portion of the working wall,
a short passage between said precombustion chamber and said steep side of said extension chamber, said flat side being substantially flush with a wall portion of said short passage and being directed substantially tangentially to an inner wall portion of said precombustion chamber.

2. The cylinder arrangement as claimed in claim 1, wherein said piston means is a displacement-type piston and on its upper surface adjacent the said extension chamber has a projection formed thereon shaped to protrude into said extension chamber when said piston means is in its upper dead point of displacement.

3. The cylinder arrangement as claimed in claim 2, wherein said projection at the upper dead point of said piston forms a gap with the wall portions of said extension chamber.

4. The cylinder arrangement as claimed in claim 3, wherein said gap is wider than a gap formed between the remaining wall portions of said combustion chamber and between the upper surface of said piston adjacent said projection.

5. In a combustion engine with external ignition,
a cylinder arrangement as claimed in claim 10 further comprising valve means opening into said pre-combustion chamber for injecting a fuel thereinto and said spark producing means being located in said pre-combustion chamber comprising a spark-plug having electrodes for the ignition of the resulting mixture in said pre-combustion chamber.

6. The combination as claimed in claim 5, wherein said piston means is a displacement-type piston and on its upper surface adjacent the said extension chamber has a projection formed thereon shaped to protrude into said extension chamber when said piston means is in its upper dead point of displacement.

7. The combination as claimed in claim 6, wherein said projection at the upper dead point of said piston forms a gap with the wall portions of said extension chamber.

8. The combination as claimed in claim 7, wherein said gap is wider than a gap formed between the remaining wall portions of said combustion chamber and between the upper surface of said piston adjacent said projection.

9. The combination as claimed in claim 5, wherein said piston means is a rotary-type piston.

10. A cylinder arrangement according to claim 1 further including a channel connecting said precombustion chamber with said remaining portion of the working wall to facilitate cleansing of said precombustion chamber.

11. A cylinder arrangement as claimed in claim 1, wherein said piston means is a rotary-type piston.

12. In a combination engine with external ignition, as claimed in claim 5, further including a scavaging passage defined in said remaining portion of the working wall connecting said pre-combustion chamber with said combustion chamber to facilitate cleansing of said pre-combustion chamber.

* * * * *

UNITED STATES PATENT OFFICE
CERTIFICATE OF CORRECTION

Patent No. 3,799,140  Dated March 26, 1974

Inventor(s) Gustav Vogelsang et al

It is certified that error appears in the above-identified patent and that said Letters Patent are hereby corrected as shown below:

In [73], change "Volkswagonwerk" to

--Volkswagenwerk--.

Signed and sealed this 9th day of July 1974.

(SEAL)
Attest:

McCOY M. GIBSON, JR.
Attesting Officer

C. MARSHALL DANN
Commissioner of Patents